United States Patent
Lee

(10) Patent No.: US 7,662,201 B2
(45) Date of Patent: Feb. 16, 2010

(54) DUST COLLECTING APPARATUS WITH A PLURALITY OF INLETS

(75) Inventor: Dong-yun Lee, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 532 days.

(21) Appl. No.: 11/601,511

(22) Filed: Nov. 17, 2006

(65) Prior Publication Data

US 2007/0214756 A1    Sep. 20, 2007

(30) Foreign Application Priority Data

Mar. 15, 2006 (KR) .................. 10-2006-0023915

(51) Int. Cl.
 *B01D 51/00* (2006.01)

(52) U.S. Cl. .................. 55/419; 55/343; 55/349; 55/429; 55/459.5; 55/DIG. 3; 15/353

(58) Field of Classification Search .............. 55/419, 55/343, 349, 429, 459.5, DIG. 3; 15/353
See application file for complete search history.

(56) References Cited

U.S. PATENT DOCUMENTS

| | | | |
|---|---|---|---|
| 2,071,975 A * | 2/1937 | Holm-Hansen et al. ........ | 55/413 |
| 3,969,096 A | 7/1976 | Richard ........................ | 55/455 |
| 6,485,536 B1 * | 11/2002 | Masters ........................ | 55/337 |
| 6,502,278 B2 * | 1/2003 | Oh et al. ....................... | 15/353 |
| 6,546,593 B2 * | 4/2003 | Oh et al. ....................... | 15/353 |
| 6,578,230 B2 * | 6/2003 | Park et al. ..................... | 15/353 |
| 6,599,348 B2 * | 7/2003 | Chosnek et al. ............... | 95/271 |
| 6,782,584 B2 * | 8/2004 | Choi ............................ | 15/352 |
| 7,311,746 B2 * | 12/2007 | Stell et al. ..................... | 55/419 |
| 7,419,522 B2 * | 9/2008 | Arnold ......................... | 55/345 |
| 2001/0054213 A1 * | 12/2001 | Oh et al. ....................... | 15/353 |
| 2004/0040270 A1 * | 3/2004 | Inoue et al. ................... | 55/345 |
| 2007/0079579 A1 * | 4/2007 | Eddington et al. ............ | 55/337 |
| 2007/0199284 A1 * | 8/2007 | Yoo et al. ..................... | 55/345 |
| 2007/0234687 A1 * | 10/2007 | Ni ................................ | 55/337 |

\* cited by examiner

*Primary Examiner*—Jason M Greene
*Assistant Examiner*—Dung Bui
(74) *Attorney, Agent, or Firm*—Ohlandt, Greeley, Ruggiero & Perle, L.L.P.

(57) ABSTRACT

The present disclosure relates to a dust collecting apparatus. The dust collecting apparatus includes a cyclone body forming a cyclone chamber; a plurality of inlets formed at the cyclone body, and causing air to enter through; and a discharging port formed at the cyclone body, and discharging the air from the cyclone chamber, wherein each inlet of the plurality of inlets is formed at a different height at a side of the cyclone body so that the air is divided to enter the cyclone chamber at a different height.

10 Claims, 5 Drawing Sheets

DUST COLLECTING APPARATUS WITH A PLURALITY OF INLETS

This application claims the benefit under 35 U.S.C. §119(a) of Korean Patent Application No. 10-2006-0023915, filed Mar. 15, 2006, the entire contents of which are hereby incorporated by reference.

BACKGROUND OF THE INVENTION

1. Field of the Invention

The present disclosure relates to a dust collecting apparatus. More particularly, the present disclosure relates to a dust collecting apparatus that draws in air and separates dust or dirt from the air.

2. Description of the Related Art

Generally, dust collecting apparatuses separating dust from air are used in household or industrial vacuum cleaners. Especially, cyclone dust collecting apparatuses, which force air to whirl and separate dust or dirt from the air using a centrifugal force without a dust bag, have been developed and used in various vacuum cleaners.

The conventional dust collecting apparatus has an inlet through which air enters at a side of an upper part of a cyclone body. Therefore, air enters the side of the cyclone body so as to whirl inside a cyclone chamber that is an inner space of the cyclone body. However, because the conventional dust collecting apparatus has only one inlet, outside air entering through the inlet forms a large lump or mass of air. The larger the size of the lump of air is, the slower the rotation speed of the air entering the inlet is. The air rotates slowly so that a centrifugal force operating upon dust or dirt contained the air is decreased. As a result, a dust separating efficiency has a predetermined limitation.

U.S. Pat. No. 3,969,096 discloses a dust collecting apparatus having a plurality of inlets formed at the same height at an upper part of a cyclone body. The dust collecting apparatus having the above-described structure divides a large lump of air into the plurality of inlets at the same height so that an initial entering speed of the air is increased but the dust separating efficiency is not much increased.

SUMMARY OF THE INVENTION

The present disclosure has been developed in order to overcome the above drawbacks and other problems associated with the conventional arrangement. An aspect of the present disclosure is to provide a dust collecting apparatus that improves the structure of inlets through which air enters so as to increase a rotation force of air thereby having a high dust separating efficiency.

Without wishing to be bound to any particular theory, it is believed that prior art dust collecting apparatus having a plurality of inlets formed at the same height result in two lumps of air that have the same speed and that crash into one another at the same height inside the cyclone chamber. It is believed that the air molecules of the two lumps of air have a different rotation angle so that the air molecules crashing against each other results in an overall decrease in kinetic energy. Therefore, as air flows downstream of the cyclone chamber of prior art devices, a rotation force of air is rapidly decreased, and an average flow rate of air with respect to the whole dust collecting apparatus is not much increased.

Therefore, it has been determined by the present disclosure that the above aspect and/or other feature of the present disclosure can substantially be achieved by providing a dust collecting apparatus, which includes a cyclone body forming a cyclone chamber; a plurality of inlets formed at the cyclone body, the plurality of inlets allowing air to enter the cyclone chamber; and a discharging port formed at the cyclone body, the discharging port allowing the air to discharge from the cyclone chamber, wherein each inlet of the plurality of inlets is formed at a different height at a side of the cyclone body so that the air is divided to enter the cyclone chamber at a different height. Therefore, because air is divided to enter through a plurality of inlets, a sectional area of the inlet is decreased so that an air entering speed is increased. Also, because air molecules with a different speed crash against each other at different heights, the speed of the air is increased so that an average flow speed of the air inside the dust collecting apparatus is increased. As a result, to change the structure of the inlet increases the dust separating efficiency.

The plurality of inlets may be formed at a side of a top part of the cyclone body or a side of a bottom part thereof. The plurality of inlets comprises a bottom end not to overlap with a top end of a next inlet, respectively. If the plurality of inlets overlaps with each other, the dust collecting apparatus according to the present disclosure may cause the same problems as the conventional dust collecting apparatus.

The dust collecting apparatus according to an embodiment of the present disclosure comprises a plurality of inlets formed at the side of the cyclone body in angular intervals of 180 degrees, and the plurality of inlets has the same sectional area, respectively.

Also, the dust collecting apparatus according to another embodiment of the present disclosure includes a plurality of inlets having a sectional area decreasing from a top inlet to a bottom inlet.

Furthermore, the dust collecting apparatus according to still another embodiment of the present disclosure further comprises an outer housing wrapping around the cyclone body, and having an housing inlet, wherein the air entering through the housing inlet is firstly separated from dust in an inner space of the outer housing, and then, enters the cyclone chamber through the plurality of inlets so as to be secondly separated from dust in the cyclone chamber. Therefore, an average rotation force of the air in the second cyclone body, which has a small size capable of being disposed inside the dust collecting apparatus, is increased so that a dust separating efficiency for fine dust is more increased.

Here, the housing inlet is formed at a side of a top part of the outer housing, wherein the plurality of inlets is formed at opposite sides of a top part of the cyclone body not to overlap with each other. Also, the sum of the sectional areas of the plurality of inlets is the substantially same as a sectional area of the housing inlet. As a result, entering air does not pile up at the inlet so that a pressure loss is not increased.

Other objects, advantages and salient features of the disclosure will become apparent from the following detailed description, which, taken in conjunction with the annexed drawings, discloses preferred embodiments of the disclosure.

BRIEF DESCRIPTION OF THE DRAWINGS

These and/or other aspects and advantages of the disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined in the description, such as a detailed construction and elements thereof, are provided to assist in a comprehensive understanding of the disclosure. Thus, it is apparent that the present disclosure may be carried out without those defined matters. Also, well-known functions or constructions are omitted to provide a clear and concise description of exemplary embodiments of the present disclosure.

Figure 1:
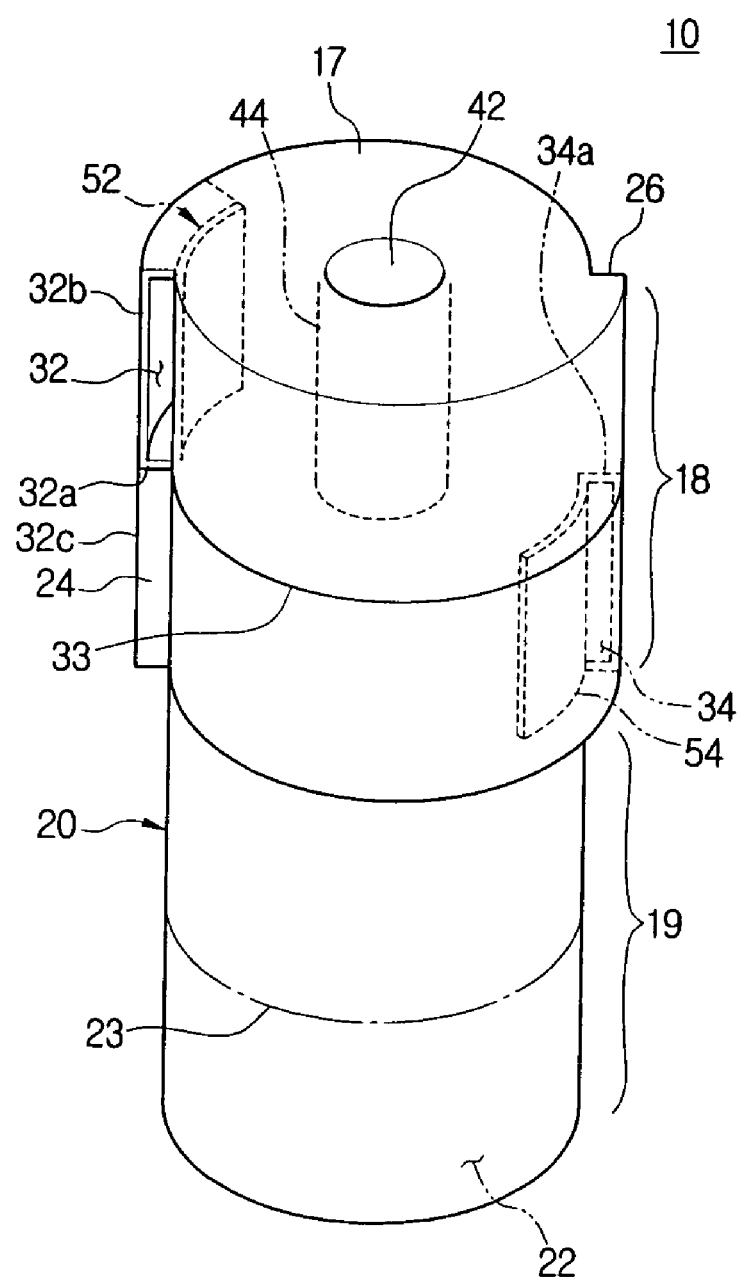
FIG. 1 is a perspective view illustrating a dust collecting apparatus according to a first embodiment of the present disclosure.
Figure 2:
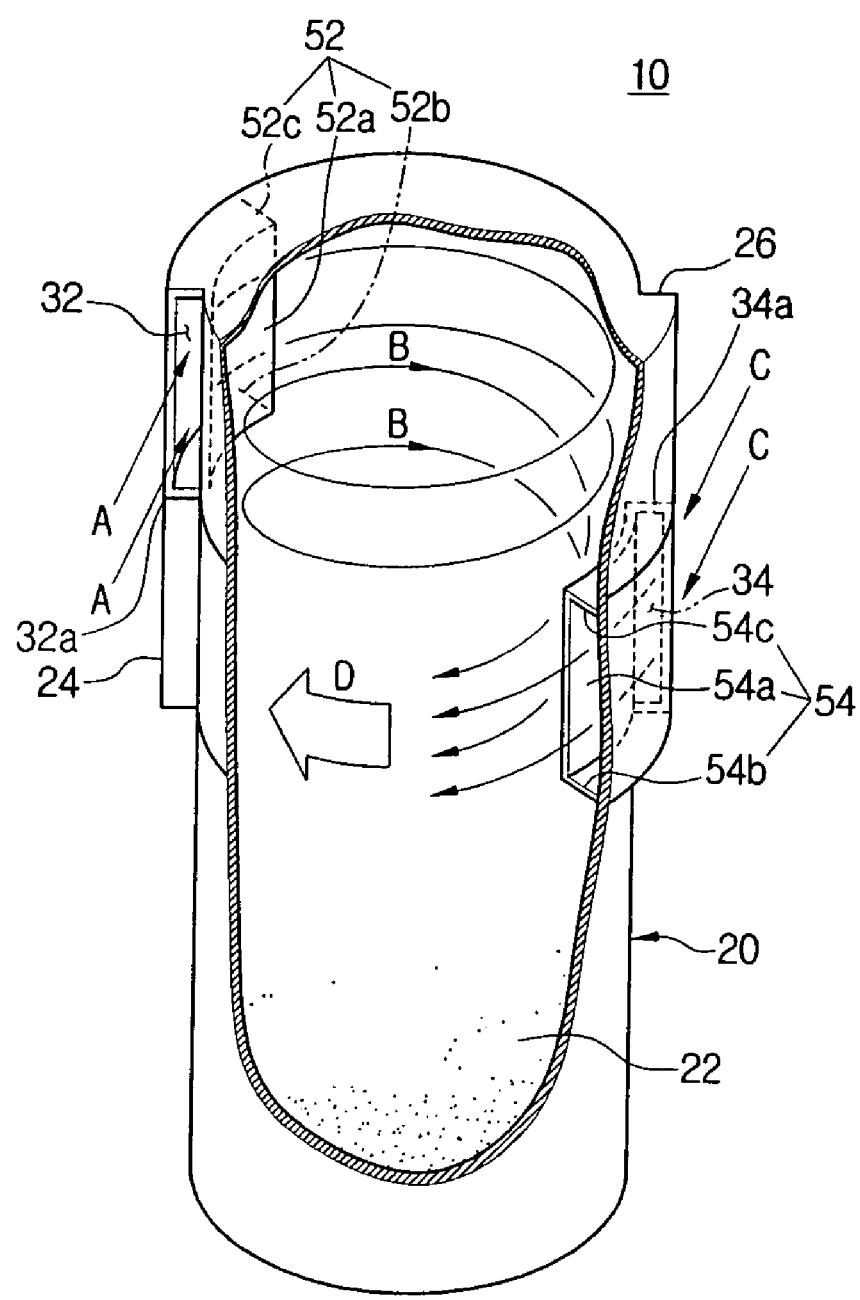
FIG. 2 is a partial cutaway perspective view illustrating the dust collecting apparatus of FIG. 1.

FIGS. 1 and 2 show a dust collecting apparatus 10 according to a first embodiment of the present disclosure.

Referring to FIGS. 1 and 2, the dust collecting apparatus 10 includes a cyclone body 20, a first inlet 32, a second inlet 34, and a discharging port 42.

A top part 18 of the cyclone body 20 in which the first and second inlets 32 and 34. First inlet 32 is defined in a first projection 24 projecting from a side surface of the top part 18. Similarly, second inlet 34 is defined in a second projection 26 projecting from an opposite side surface of the top part 18. Due to first and second inlets 32 and 34, top part 18 does not have a complete circular section, but rather has a partially twisted circular section twisted as shown in FIG. 1. A bottom part 19 of the cyclone body 20 has a circular section. The bottom part 19 includes a space in which air entering through the first and second inlets 32 and 34 rotates, and a dust collecting space 22 in which dust or dirt separated from air is collected. In one embodiment, the cyclone body 20 is formed so that the dust collecting space 22 may be separated at a line 23 in FIG. 1. In alternative embodiments, the cyclone body 20 is formed so that a bottom surface of the dust collecting space 22 may be opened.

The first inlet 32 is formed at a top portion 32b of the first protection 24, and a bottom portion 32c of the first projection 24 is closed as shown in FIGS. 1 and 2. Referring to FIG. 2, a first guiding plate 52 extends from the first inlet 32 inside the cyclone body 20 so as to guide air entering through the first inlet 32. The first guiding plate 52 has a side plate 52a, a bottom plate 52b, and a upper plate 52c so as to form a duct from the first inlet 32 to a predetermined length inside the cyclone body 20.

The second inlet 34 is formed at a bottom portion of the second projection 26 and a top portion of the second projection 26 is closed. A top end 34a of the second inlet 34 is located at a height lower than the bottom end 32a of the first inlet 32 so as to not overlap with the bottom end 32a of the first inlet 32. In other words, the top end 34a of the second inlet 34 is located at a level lower than an imaginary horizontal line 33 of FIG. 1, where the bottom end 32a of the first inlet 32 is located at a higher level than the imaginary line 33. A second guiding plate 54 extends from the second inlet 34 inside the cyclone body 20 so as to form a duct with a predetermined length for guiding air from the second inlet 34 to the inside of the cyclone body 20. The second guiding plate 54 has a top plate 54c, a side plate 54a and a bottom plate 54b so as to form the duct.

Referring to FIG. 1, the discharging port 42 is formed at a center of the top surface 17 of the cyclone body 20. A discharging pipe 44 extends from the discharging port 42 to the inside of the cyclone body 20. The discharging pipe 44 functions as a rotation center of an air and guides discharging air so as to prevent the discharging air from mixing entering air.

Hereinafter, an operation of the dust collecting apparatus 10 according to the first embodiment of the present disclosure will be explained with reference to FIG. 2.

Air is divided to enter the inside of the cyclone body 20 at the substantially same speed through the first and second inlets 32 and 34 as illustrated by arrows A and C, respectively. Air entering through the first inlet 32 is guided to flow along an inside surface of the cyclone body 20 by the side plate 52a, the bottom plate 52b, and the upper plate 52c, and rotates downward as arrow B. The air entering through the first inlet 32 has a weaker rotation force when rotating at a lower level than when passing through the first inlet 32. The air entering through the first inlet 32 joins air entering at high speed through the second inlet 34 as shown by arrow C at the lower level. Therefore, the speed of joined air increases, and the joined air rotates as illustrated by arrow D so that dust or dirt is separated from the joined air. Separated dust or dirt 50 falls to be collected in the dust collecting space 22. As a result, an average rotation force of air is increased so that the dust separating efficiency is increased.

Figure 3A:
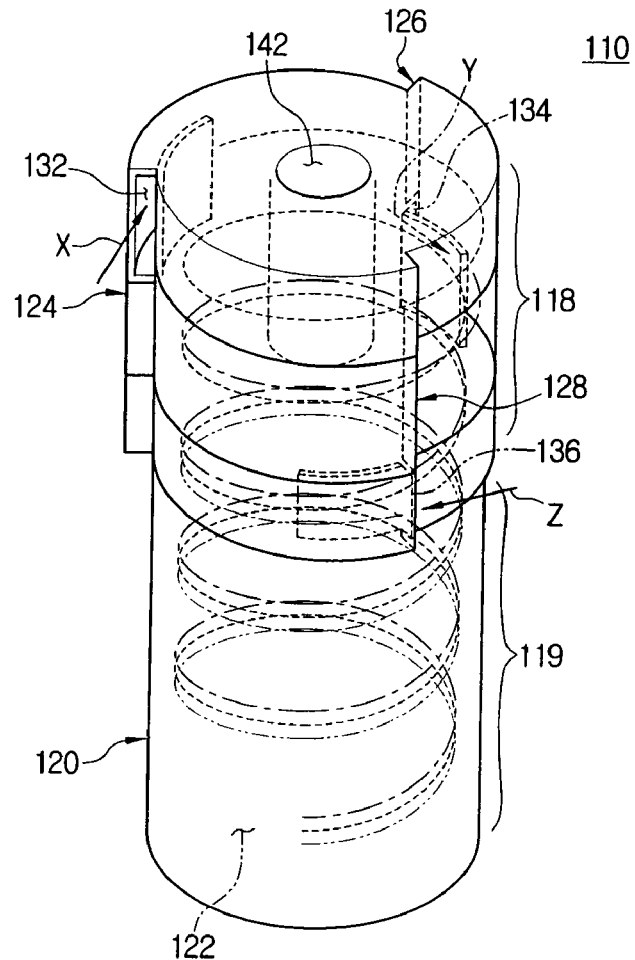
FIG. 3A is a perspective view illustrating a dust collecting apparatus according to a second embodiment of the present disclosure.
Figure 3B:
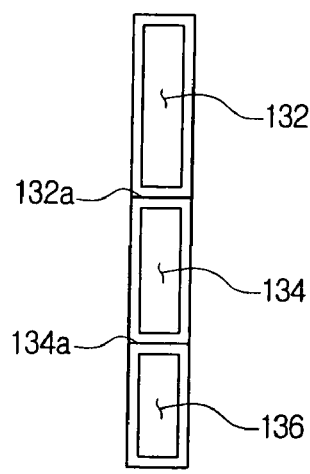
FIG. 3B is a view illustrating sectional areas of a first, a second, and a third inlet of the dust collecting apparatus of FIG. 3A.

FIGS. 3A and 3B show a dust collecting apparatus 110 according to a second embodiment of the present disclosure. Here, component parts performing similar or analogous functions are labeled in multiples of one hundred.

Referring to FIG. 3A, the dust collecting apparatus 110 includes a cyclone body 120, first, second, and third inlets 132, 134, and 136, and a discharging port 142.

The cyclone body 120 includes a top part 118 and a bottom part 119. The top part 118 has first, second, and third projections 124, 126, and 128 projecting from the cyclone body 120 at angular intervals of approximate 120 degrees in a circumferential direction of the cyclone body 120. The first inlet 132 is formed at the first projection 124, the second inlet 134 is formed at the second projection 126, and the third inlet 136 is formed at the third projection 128. The bottom part 119 is formed in a cylindrical shape, and has a space at a top portion thereof for air to rotate and a dust collecting space 122 at a bottom portion for collecting dust.

The first, second, and third inlets 132, 134, and 136 are, respectively, formed at the first, second, and third projections 124, 126, and 128 projecting from the top part 116 of the cyclone body 120 at angular intervals of approximate 120 degrees in a circumferential direction of the cyclone body 120. The first inlet 132 is formed at a top of the top part 118, and the second inlet 134 is formed to extend downward from a bottom end 132a of the first inlet 132. The third inlet 136 is formed to extend downward from a bottom end 134a of the second inlet 134. As shown in FIG. 3B, the first, second, and third inlets 132, 134, and 136 have the same width, respectively. The first inlet 132 has a maximum height, the second inlet 134 has a medium height, and the third inlet 136 has a minimum height. Therefore, the sectional area of the inlets becomes smaller in order of the first, second, and third inlets 132, 134, and 136. In other words, regardless of how many inlets the cyclone body 120 has, a sectional area of the subsequent inlet decreases from a top inlet to a bottom inlet.

The discharging port 142 is the same as the dust collecting apparatus 10 according to the first embodiment of the present disclosure described above, and therefore, detailed description thereof will be omitted.

Hereinafter, an operation of the dust collecting apparatus 110 according to the second embodiment of the present disclosure will be explained with reference to FIG. 3A.

Air is divided to enter the inside of the cyclone body 120 through the three inlets 132, 134, and 136 having a different sectional area at a high speed as illustrated by arrows X, Y, and Z, respectively. A maximum amount of air enters as illustrated by arrow X through the first inlet 132 having the maximum sectional area to rotate downward. Then, a medium amount of air enters as illustrated by arrow Y through the second inlet 134 having the medium sectional area and joins the air entering through the first inlet 132 so that the flow speed of the joined air is increased. Finally, the joined air joins a minimum amount of air entering as illustrated by arrow Z through the third inlet 136 with the minimum sectional area so as to further increase the flow speed. Because the three inlets 132, 134, and 136 have a different sectional area, the air entering through the first inlet 132 has a minimum flow speed, the air entering through the second inlet 134 has a medium flow speed, and the air entering through the third inlet 136 has a maximum flow speed. The air entering through the first inlet 132 has a large amount and a relatively slow flow speed, but has a maximum number of rotations because the first inlet 132 is located at the highest height. The air entering through the second inlet 134 has a medium number of rotations. The air entering through the third inlet 136 has a small amount of air and a fast flow speed, but has a minimum number of rotations. As a result, although the airs entering through the first, second, and third inlets 132, 134, and 136 have a different amount of air and a different flow speed, dust is effectively separated from the airs. Also, because the average rotation flow speed of the air rotating inside the cyclone body 120 is increased, a total dust separating efficiency of the dust collecting apparatus 110 is increased.

Figure 4:
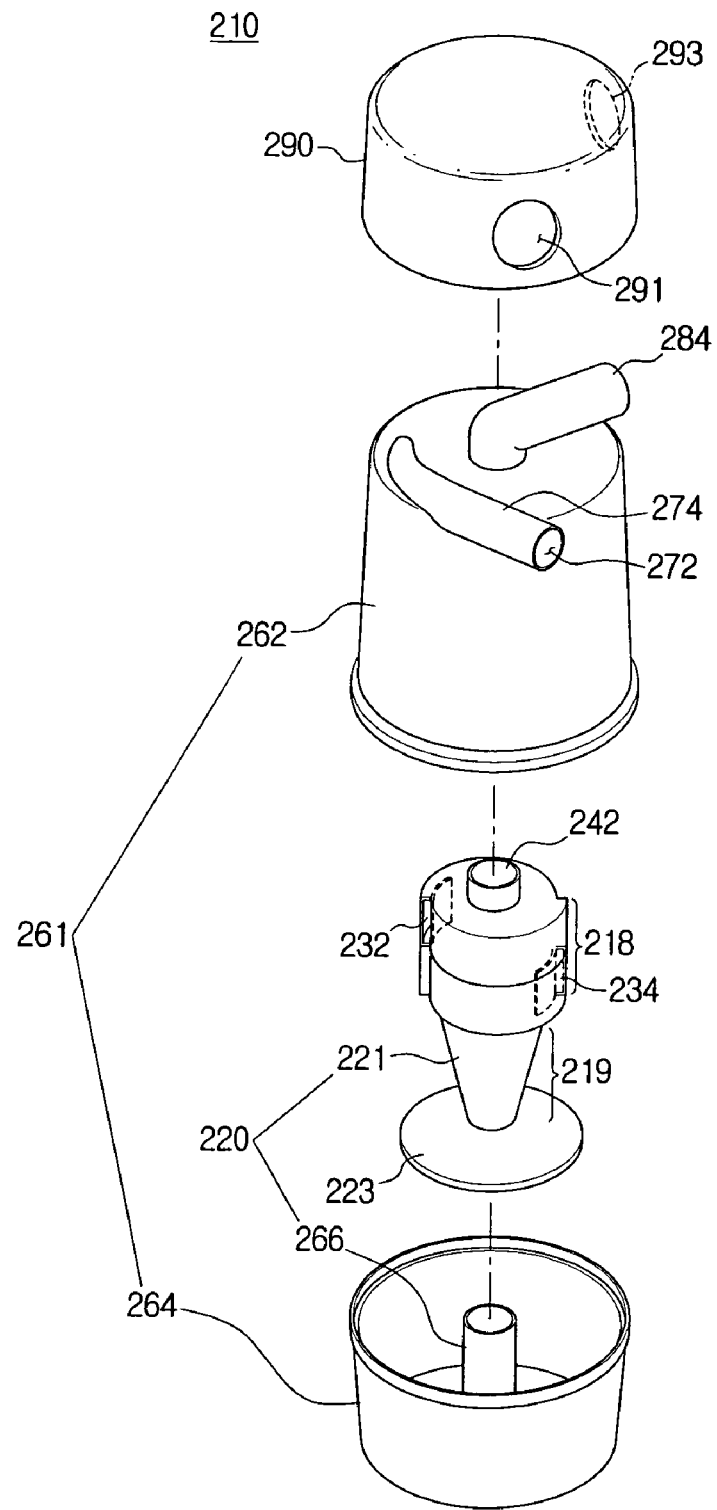
FIG. 4 is an exploded perspective view illustrating a dust collecting apparatus according to a third embodiment of the present disclosure.
Figure 5:
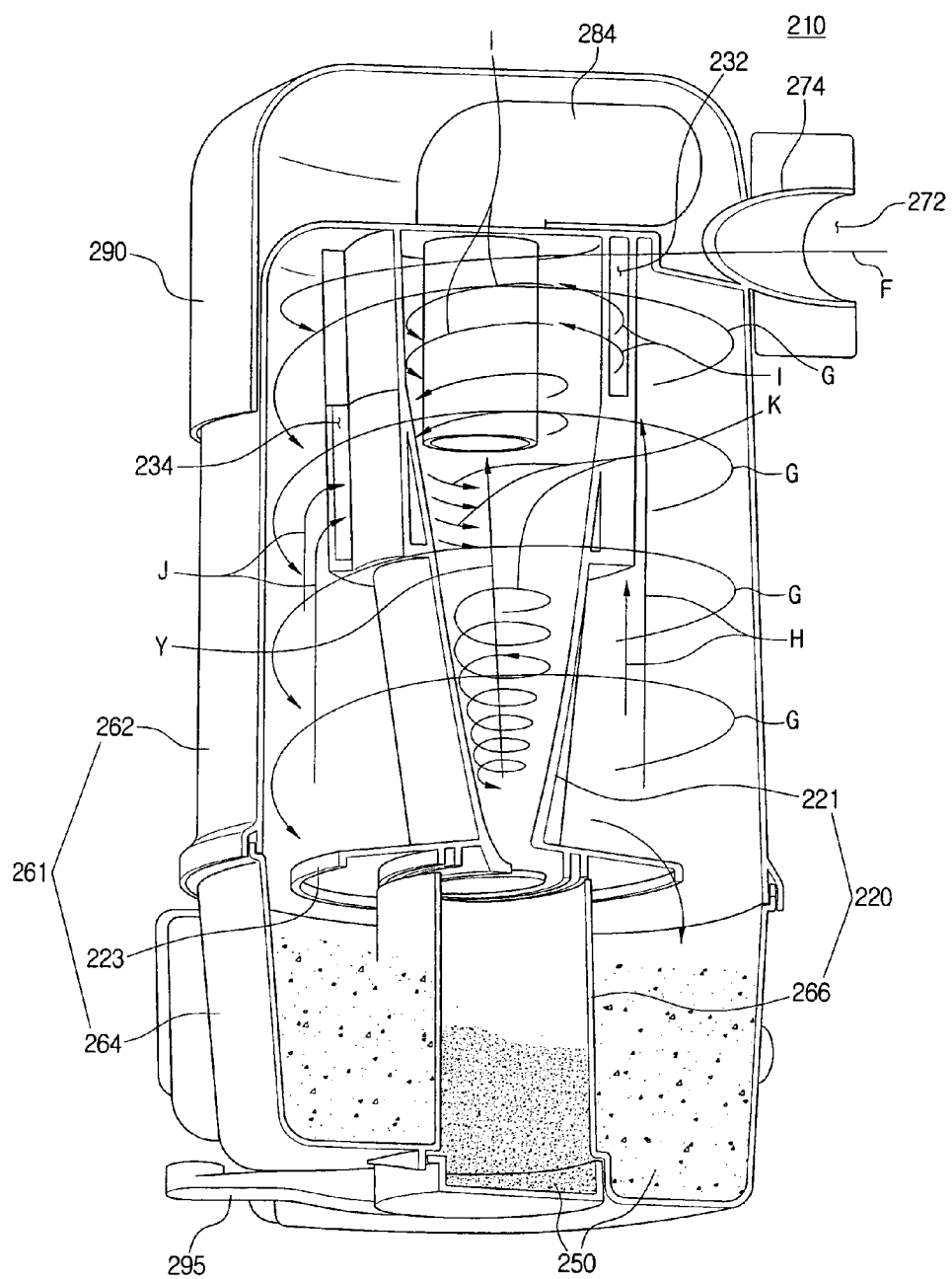
FIG. 5 is a partial cutaway perspective view illustrating the dust collecting apparatus of FIG. 4.

FIGS. 4 and 5 show a dust collecting apparatus 210 according to a third embodiment of the present disclosure. Here, component parts performing similar or analogous functions are labeled in multiples of one hundred. FIG. 4 is an exploded perspective view illustrating parts of the dust collecting apparatus 210 according to the third embodiment, and FIG. 5 is a partial cutaway perspective view illustrating the dust collecting apparatus 210 of FIG. 4.

Referring to FIGS. 4 and 5, the dust collecting apparatus 210 according to the third embodiment of the present disclosure includes a cyclone body 220, an outer housing 261, and a cover 290.

The cyclone body 220 includes an inner receptacle 221 and an inner dust receptacle 266 that can be separated from and coupled with each other. A top part 218 of the inner receptacle 221 has a first inlet 232, a second inlet 234 formed at an approximate 180 degrees from the first inlet 232, and a discharging port 242 formed at a top surface thereof. A bottom part 219 of the inner receptacle 221 has a substantially cone shape having a diameter decreasing from a top end to a bottom end unlike the first and second embodiments. A skirt 223 is formed at a bottom end of the bottom part 219, and prevents dust collected in an outer dust receptacle 264 from flowing back toward the first and second inlets 232 and 234. The inner dust receptacle 266 is formed integrally with the outer dust receptacle 264 using an injection mold. Also, a top end of the inner dust receptacle 266 is closely coupled to a bottom end of the inner receptacle 221 so that dust collected in the inner dust receptacle 266 may not be mixed with dust or dirt collected in the outer dust receptacle 264.

The outer housing 261 includes an outer receptacle 262 and the outer dust receptacle 264 that can be separated from and coupled with each other. A discharging air guiding pipe 284 discharges air cleaned in the inner receptacle 221 to the outside, and is formed at a center of a top surface of the outer receptacle 262. A housing inlet pipe 274 for air to enter the inner space of the outer receptacle 262 is formed at a side of the top surface of the outer receptacle 262. The discharging air guiding pipe 284 is shaped like a letter "L", and is formed to cover the discharging port 242 of the inner receptacle 221 so as to fluid communication with an inner space of the inner receptacle 221 through the discharging port 242. The housing inlet pipe 274 has a helical portion nearby the top surface of the outer receptacle 262 so as to force air entering through a housing inlet 272 to rotate into the outer receptacle 262. At this time, a sectional area of the housing inlet 272 is preferably the substantially same as the sum of the sectional areas of the plurality of inlets, namely, the first and second inlets 232 and 234.

The cover 290 is formed to cover a top of the outer receptacle 262 and has a first opening 291 and a second opening 293. The first opening 291 is a hole through which the housing inlet pipe 274 passes, and the second opening 293 is a hole through which the discharging air guiding pipe 284 passes. In FIG. 5, reference numeral 295 presents a lever unit, which raises the inner and outer dust receptacles 266 and 264 to be coupled with the inner and outer receptacles 221 and 262, and lowers the inner and outer dust receptacles 266 and 264 to be separated from the inner and outer receptacles 221 and 262.

Hereinafter, an operation of the dust collecting apparatus 210 according to the third embodiment of the present disclosure will be explained with reference to FIG. 5.

Referring to FIG. 5, air enters the inner space of the outer receptacle 262 through the housing inlet 272 (see arrow F). When the entering air rotates downward in a space between the inner receptacle 221 and the outer receptacle 262 as illustrated by arrow G, large dust and/or dirt is separated from the air by a centrifugal force to fall into a space between the inner dust receptacle 266 and the outer dust receptacle 264. The entering air loses rapidly its rotation force by the skirt 223 disposed at the bottom end of the inner receptacle 221, and rises up. At this time, some dust rises with rising air, but it crashes against the skirt 223 and falls again into the outer dust receptacle 264.

The air lowering to the bottom part of the outer receptacle 262 is re-raised up to enter the first inlet 232 and the second inlet 234 formed at the inner receptacle 221 by a suction force of the inner receptacle 221 (see arrows H and J). When the air entering the inner receptacle 221 through the first inlet 232 rotates downward (see arrow I), the air entering through the first inlet 232 joins the air (see arrow K) entering through the second inlet 234 so as to increase its rotation speed. When the joined air keeps rotating downward in the inner receptacle 221, fine dust is separated from the joined air. The air having fine dust separated rises up to be discharged outside through the discharging port 242 and the discharging air guiding pipe 284. Therefore, because large dust or dirt is firstly separated in the outer housing 261 and fine dust is secondly separated in the cyclone body 220, the dust separating efficiency is increased. Especially, the cyclone body 220 for separating fine dust includes a plurality of inlets 232 and 234 having a different height so that the average rotation speed of the air in the cyclone body 220 is increased. As a result; the dust separating efficiency for fine dust is more increased.

With the dust collecting apparatus according to an embodiment of the present disclosure, the cyclone body has a plurality of inlets so as to divide air to enter, thereby increasing an entering speed of air. The plurality of inlets with a different height forces the air, the speed of which is decreased, to join the fast air so as to increase the average rotation speed of the air. Therefore, the dust separating efficiency is increased.

Also, because the plurality of inlets has a sectional area decreasing from a top to a bottom, dust is separated evenly from air entering through each of the plurality of inlets.

Also, in a dust collecting apparatus with multiple cyclones, because a second cyclone has a plurality of inlets formed at a different height at a side of the second cyclone, the dust separating efficiency for fine dust that is too light to be separated is increased. Therefore, the dust separating efficiency for total dust is increased.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the disclosure.

What is claimed is:

1. A dust collecting apparatus comprising:
   a cyclone body forming a cyclone chamber;
   a plurality of inlets formed at the cyclone body, the plurality of inlets allowing air to enter the cyclone chamber; and
   a discharging port formed at the cyclone body, the discharging port allowing the air to discharge from the cyclone chamber,
   wherein each inlet of the plurality of inlets is formed at a different height at a side of the cyclone body so that the air is divided to enter the cyclone chamber at different heights, and
   wherein the plurality of inlets have a sectional area decreasing from a top inlet to a bottom inlet.

2. The dust collecting apparatus of claim 1, wherein the plurality of inlets is formed at a side of a top part of the cyclone body.

3. The dust collecting apparatus of claim 2, wherein each inlet of the plurality of inlets comprises a bottom end and a top end, wherein the bottom end of one inlet does not to overlap with the top end of a next inlet, respectively.

4. The dust collecting apparatus of claim 2, wherein the plurality of inlets comprises two inlets formed at the side of the cyclone body in angular intervals of 180 degrees.

5. The dust collecting apparatus of claim 1, further comprising:
   an outer housing wrapping around the cyclone body, the outer housing having an housing inlet,
   wherein the air entering through the housing inlet firstly is separated from dust in an inner space of the outer housing, and then, enters the cyclone chamber through the plurality of inlets so as to be secondly separated from dust in the cyclone chamber.

6. The dust collecting apparatus of claim 5, wherein the housing inlet is formed at a side of a top part of the outer housing,
   wherein each inlet of the plurality of inlets is formed at an opposite side of a top part of the cyclone body and do not to overlap with each other.

7. A dust collecting apparatus comprising:
   a cyclone body forming a cyclone chamber;
   a first inlet formed at a first side of the cyclone body, the first inlet allowing air to enter the cyclone chamber at a first height;
   a second inlets formed at a second side of the cyclone body, the second inlet allowing air to enter the cyclone chamber at a second height; and
   a discharging port formed at the cyclone body, the discharging port allowing the air to discharge from the cyclone chamber, the first height being different than the second height,
   wherein the first inlet has a first sectional area and the second inlet has a second sectional area, and
   wherein the first and second sectional areas are different from one another.

8. The dust collecting apparatus of claim 7, wherein the first inlet is a top inlet and the second inlet is a bottom inlet, and wherein the first sectional area is larger than the second sectional area.

9. The dust collecting apparatus of claim 7, wherein the first inlet has a bottom end and the second inlet has a top end, and wherein the bottom end does not to overlap with the top end.

10. The dust collecting apparatus of claim 7, further comprising an outer housing wrapping around the cyclone body, the outer housing having an housing inlet, wherein the air entering through the housing inlet firstly is separated from dust in an inner space of the outer housing, and then, enters the cyclone chamber through the first and second inlets so as to be secondly separated from dust in the cyclone chamber.

* * * * *